United States Patent
Chen et al.

(10) Patent No.: US 9,976,862 B2
(45) Date of Patent: May 22, 2018

(54) METHOD, DEVICE, AND TERMINAL FOR SIMULTANEOUSLY DISPLAYING MULTIPLE USERS' LOCATIONS ON A MAP

(71) Applicant: Tencent Technology (Shenzhen) Co., Ltd., Shenzhen, Guangdong (CN)

(72) Inventors: Pinlin Chen, Guangdong (CN); Yi Shan, Guangdong (CN); Jun Wang, Guangdong (CN); Liang Wu, Guangdong (CN); Runjia Huang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 85 days.

(21) Appl. No.: 15/160,806

(22) Filed: May 20, 2016

(65) Prior Publication Data
US 2016/0265927 A1 Sep. 15, 2016

Related U.S. Application Data

(63) Continuation of application No. PCT/CN2014/094166, filed on Dec. 18, 2014.

(30) Foreign Application Priority Data

Jan. 24, 2014 (CN) .......................... 2014 1 0036522

(51) Int. Cl.
*G01C 21/00* (2006.01)
*G01C 21/34* (2006.01)
(Continued)

(52) U.S. Cl.
CPC ......... *G01C 21/3407* (2013.01); *G01C 21/20* (2013.01); *G01C 21/3664* (2013.01); *G01C 21/3673* (2013.01); *G06Q 50/00* (2013.01)

(58) Field of Classification Search
CPC ............... G01C 21/3407; G01C 21/20; G01C 21/3664; G01C 21/3673; G06Q 50/00
(Continued)

(56) References Cited

U.S. PATENT DOCUMENTS

2007/0281690 A1* 12/2007 Altman ................. H04W 4/185
455/435.1

FOREIGN PATENT DOCUMENTS

CN 101543029 A 9/2009
CN 102821058 A 12/2012
(Continued)

OTHER PUBLICATIONS

International Search Report and Written Opinion received in PCT Application No. PCT/CN2014/094166 dated Mar. 25, 215.
(Continued)

*Primary Examiner* — Gertrude Arthur Jeanglaude
(74) *Attorney, Agent, or Firm* — Brinks Gilson & Lione

(57) ABSTRACT

The present disclosure directs to method, device, and terminal for displaying multiple users' locations on a map. The method includes: acquiring the most current locations of all the users who participate in sharing their locations; determining a starting location on a map, creating a starting region centered on the starting location, and gradually expanding the starting region in accordance with the most current location or each of the users who participate in sharing their locations, until a target region including the most current locations of all the users who participate in sharing their locations is acquired; and determining and displaying a viewable region on the map in accordance with the target region. The target region starting region expands to display a viewable region on the map as determined, such that the most current locations of users participating in sharing location may be efficiently acquired.

23 Claims, 6 Drawing Sheets

(51) Int. Cl.
  *G01C 21/20* (2006.01)
  *G01C 21/36* (2006.01)
  *G06Q 50/00* (2012.01)
(58) Field of Classification Search
  USPC ...... 701/300, 409, 410, 422; 340/988, 995.1
  See application file for complete search history.

(56) References Cited

FOREIGN PATENT DOCUMENTS

| | | |
|---|---|---|
| CN | 103036953 A | 4/2013 |
| CN | 103313191 A | 9/2013 |
| CN | 104035951 A | 9/2014 |
| JP | 2008-15717 A | 1/2008 |

OTHER PUBLICATIONS

First Chinese Office Action received in Chinese Application No. CN2014100365227 dated Feb. 16, 2015.

* cited by examiner

METHOD, DEVICE, AND TERMINAL FOR SIMULTANEOUSLY DISPLAYING MULTIPLE USERS' LOCATIONS ON A MAP

CROSS-REFERENCE TO RELATED APPLICATIONS

The application is a continuation of PCT Application No. PCT/CN2014/094166, filed on Dec. 18, 2014, which claims priority to Chinese Patent Application No. 2014100365227, filed on Jan. 24, 2014, which is incorporated by reference in their entireties.

FIELD OF THE TECHNOLOGY

The present disclosure relates to internet technologies, particularly to, the method, device, and terminal for simultaneously displaying multiple users' locations on a map.

BACKGROUND

With the rapid development of internet technology and global positioning system (GPS) technology, many instant messaging systems have also developed users geography location services, which facilitate sharing real-time geographical location viewable among different users. In other words, users who participate in sharing their locations may usually be able to view the most current locations of the peer users displayed on a same map through a viewable region on a map.

A viewable region on a map may display a portion of a geographical area in a map format which is viewable through a display screen on the terminal. However, due to the small and limited display screen size on the terminal, current viewable region on the map usually displays just a static map which is constant and fixed in geographical boundary. Therefore, if many users simultaneously share their locations in a same chat session, those users who are located far away from the location of the host user's terminal may not be included in a viewable region on the map due to screen size and resolution limitation. Alternately, users whose locations are changing (i.e., on a vehicle or walking) also may not be updated automatically to reflect their new current locations, or in case if they have moved to a new location outside the boundary of the viewable region on the map.

To simply put, not all the users who participate in sharing their locations may be displayed on the viewable region on the displayed map. The efficiency of acquiring all the most current locations of participating users who are diversely located or who constantly changes their locations may be quite poor.

SUMMARY

For purpose of solving the related technical problems, a method, device, terminal for simultaneously displaying multiple users' locations on a map may be provided and described hereinafter:

A first aspect of the disclosure discloses a method for simultaneously displaying multiple users' locations on a map may include the following operations: acquiring the most current locations of all the users who participate in sharing their locations; determining a starting location on a map, creating a starting region centered on the starting location, and gradually expanding the starting region in accordance with the most current location of each of the users who participate in sharing their locations, until a target region including the most current locations of all the users who participate in sharing their locations is acquired: and determining and displaying a viewable region on the map in accordance with the target region.

A second aspect of the disclosure discloses, a device for simultaneously displaying multiple users' locations on a map, which the device may include at least a processor with circuitry operating in conjunction with at least a memory storing codes to be executed to perform functions as a plurality of modules, wherein the plurality of modules include: an acquiring module, configured to acquire most current locations of all the users who participate in sharing their locations; a determining module, configured to determine a starting location on the map; a creating module, configured to create a starting region centered on the starting location; an expanding module, configured to gradually expand the starting region in accordance with the most current location of each of the users who participate in sharing their locations, until a target region including the most current locations of all the users who participate in sharing their locations is acquired; and a displaying module, configured to determine and display a viewable region on the map in accordance with the target region.

A third aspect of the disclosure discloses, a terminal for simultaneously displaying multiple users' locations on a map, comprising at least a memory storing one or more programs, wherein the one or more programs are executed by at least one processors to perform the operations of: acquiring the most current locations of all the users who participate in sharing their locations; determining a starting location on a map, creating a starting region centered on the starting location, and gradually expanding the starting region in accordance with the most current location of each of the users who participate in sharing their locations, until a target region including the most current locations of all the users who participate in sharing their locations is acquired; and determining and displaying a viewable region on the map in accordance with the target region.

The disclosures offer the advantages of a starting region may be expanded to acquire a target region which may include a most current location of each of the users who participate in sharing their locations. The efficiency in acquiring the most current locations of all the users who participate in sharing their respective locations is therefore improved.

BRIEF DESCRIPTION OF THE DRAWINGS

The accompanying drawings may be included to provide further understanding of the claims and disclosure which may be incorporated in, and constitute a part of this specification. The detailed description and illustrated embodiments described may serve to explain the principles defined by the claims.

DETAILED DESCRIPTION OF ILLUSTRATED EMBODIMENTS

The various embodiments of the disclosure may be further described in details in combination with attached drawings and embodiments below. It should be understood that the specific embodiments described here may be used only to explain the disclosure, and may not be used to limit the disclosure. In addition, for the sake of keeping description brief and concise, the newly added features, or features which may be different from those previously described in each new embodiment may be described in details. Similar features may be referenced back to the prior descriptions in a prior numbered drawing or referenced ahead to a higher numbered drawing. Unless otherwise specified, all technical and scientific terms herein may have the same meanings as understood by a person skilled in the art.

With the rapid development of Internet technology, more and more instant messaging chat systems provide users with real-time interactive information, such as instant position location services. Thus, users participating in instant chat systems may participate in sharing their real time locations.

Embodiments of the present disclosure provide a method of displaying a map through which the most current locations of users participating in sharing location may be displayed on the viewable region on the map displayed on a terminal. Therefore, the users may acquire the most current locations of users participating in sharing location to real time form the viewable region on the map displayed on the terminal.

Embodiments of the present disclosure does not limit the terminal on which viewable region on the map is displayed, the terminal may be smart phones, tablet PCs, e-book readers, MP3 (Moving Picture Experts Group Audio Layer III) player, MP4 (Moving Picture Experts Group Audio Layer IV) players, portable laptop computers, and desktop computers, or any devices capable of connecting to a network and with a GPS receiver.

Figure 1:
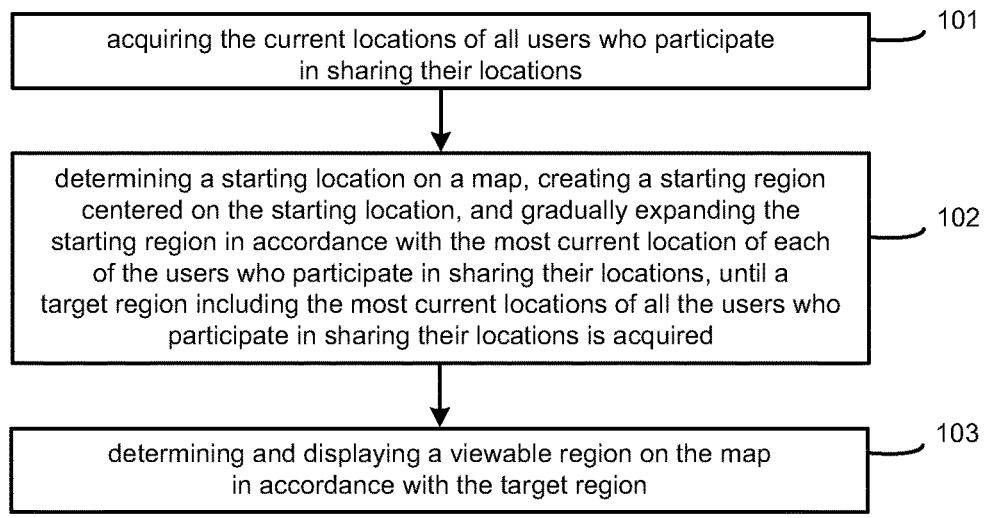
FIG. 1 is a flow chart showing a method for simultaneously displaying multiple users' locations on a map, according to a first embodiment of present disclosure.
Figure 2:
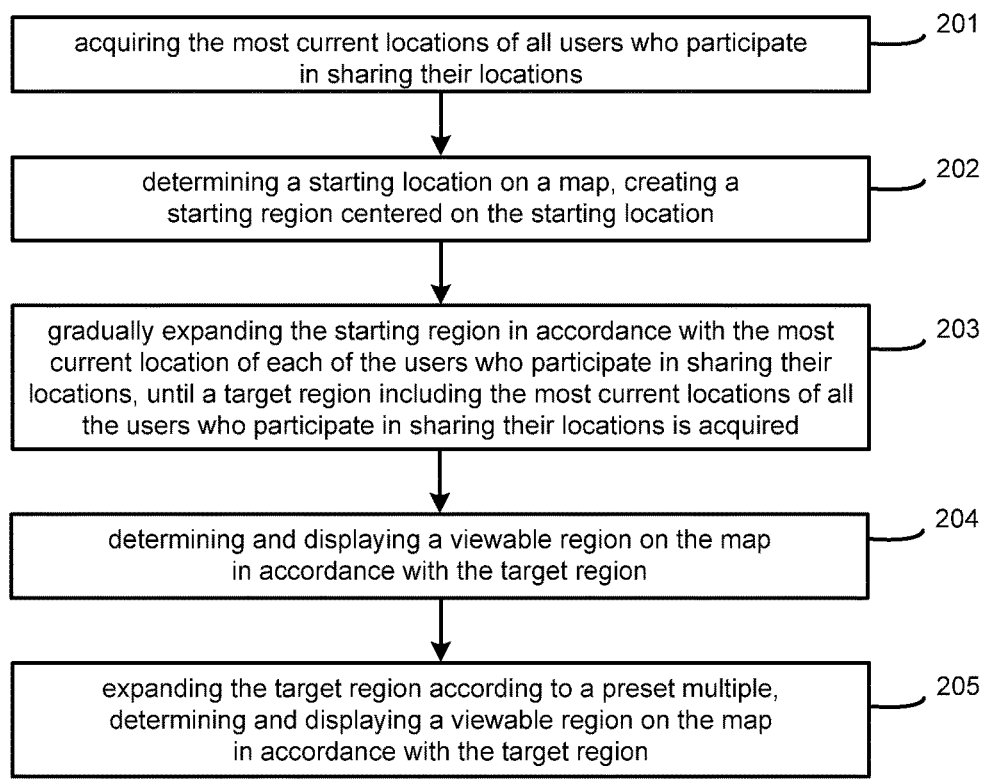
FIG. 2 is a flow chart showing a method for simultaneously displaying multiple users' locations on a map, according to a second embodiment of present disclosure.

FIGS. 1 and 2 both show a method for simultaneously displaying multiple users' locations on a map describes the method of displaying a map according to a first and a second embodiment of the present disclosure.

Embodiment 1

As shown in FIG. 1, the method according to the embodiment of the present disclosure includes:

Step 101: acquiring the most current locations of all the users who participate in sharing their locations;

Step 102: determining a starting location on a map, creating a starting region centered on the starting location, and the gradually expanding the starting region in accordance with the most current location of each of the users who participate in sharing their locations, until a target region including the most current locations of all the users who participate in sharing their locations is acquired;

Step 103: determining and displaying a viewable region on the map in accordance with the target region.

Preferably, after the gradual expanding of the starting region in accordance with the most current location of each of the users who participate in sharing their locations, until a target region including the most current locations of all the users who participate in sharing their locations is acquired, wherein the method further includes: expanding the target region according to a preset multiple. Wherein the determining and the displaying of the viewable region on the map in accordance with the target region include: determining and displaying the viewable region on the map in accordance with the target region after being expanded.

Preferably, the acquiring of the most current locations of all the users who participate in sharing their locations includes: acquiring the adjusting instruction of the viewable region on the map according to whether the number of users who participate in sharing their locations and the locations of users who participate in sharing their locations has changed, and whether at least one triggering situation set in the adjusting instruction of the viewable region on the map is received.

Preferably, the determining of the starting location on the map, which includes: determining a location which corresponds to a point of interest on the map as the starting location, with the point of interest being predetermined by all the users who participate in sharing their locations.

Preferably, the determining of the starting location on the map includes: determining a location on the map which corresponds to the most current location of the user who is one of the users who participate in sharing their locations as the starting location.

Preferably, after the gradual expanding of the starting region in accordance with the most current location of each of the users who participate in sharing their locations, until the target region including most current locations of all the users who participate in sharing their locations is acquired, include: gradually expanding the starting region centered on the center of the starting region before expanding in accordance with the most current location of each of the users who participate in sharing their locations, until the target region including most current locations of all the users who participate in sharing their locations is acquired.

Preferably, after the gradual expanding of the starting region in accordance with the most current location of each of the users who participate in sharing their locations, until a target region including the most current locations of all the users who participate in sharing their locations is acquired, the method includes: gradually expanding the starting region in accordance with the location relationship between the starting region and the most current location of each of the users who participate in sharing their locations, until a target region which includes most current locations of all the users who participate in sharing their locations is acquired.

Preferably, after the determining and the displaying a viewable region on the map in accordance with the target region, the method further includes: determining respective paths among the most current locations of each of the users according to the most current locations of each of the users displayed on the viewable region on the map; and displaying the respective paths among the most current locations of each of the users in the viewable region on the map.

Preferably, after the determining respective paths among the most current locations of each of the users according to the most current locations of each of the users displayed on the viewable region on the map, wherein the method further includes: determining respective distances among the most current locations of each of the users according to the paths among the most current locations of each of the users; and displaying the respective distances among the most current locations of each of the users in the viewable region on the map.

Preferably, after the determining and the displaying of the viewable region on the map in accordance with the target region, wherein the method further includes: determining the respective paths between the preset target locations and the most current locations or each of the users according to the most current locations of each of the users displayed on the viewable region on the map; and displaying the respective paths between the preset target locations and the most current locations of each of the users in the viewable region on the map.

Preferably, after the determining of the respective paths between the preset target locations and the most current locations of each of the users according to the most current locations of each of the users displayed on the viewable region on the map, wherein the method further includes: determining respective distances between the preset target locations and the most current locations of each of the users according to the respective paths between the preset target locations and the most current locations of each of the users; and displaying the respective distances between the preset target locations and the most current locations of each of the users in the viewable region on the map.

Preferably, after determining respective distances between the preset target locations and the most current locations of each of the users according to the respective paths between the preset target locations and the most current locations of each of the users, wherein the method further includes: determining a respective time spent traveling from the most current locations of each of the users to the preset target locations according to the respective distances between the preset target locations and the most current locations of each of the users; and displaying the respective time spent traveling from the most current locations of each of the users to the preset target locations in the viewable region on the map.

Preferably, after determining the respective distances between the preset target locations and the most current locations of each of the users according to the respective paths between the preset target locations and the most current locations of each of the users, wherein the method further includes: sending respective distance prompts to the terminals used by users who arrive the preset target location through the same paths.

Preferably, after determining the respective paths between the preset target locations and the most current locations or each of the users according to the most current locations of each of the users displayed on the viewable region on the map, wherein the method further includes: determining users who stay from the respective paths according to the most current locations of each of the users, and sending path deviation prompts to the terminals used by users who deviate from the respective paths.

The method according to embodiment of the present disclosure is carried out by acquiring a target region which including the most current locations of all the users who participate in sharing their locations through expanding the starting region, determining and displaying a viewable region on the map in accordance with the target region, making sure that the users may acquire the most current locations of users participating in sharing location, thus, the efficiency of acquiring the most current locations of users participating in sharing location is improved.

Embodiment 2

As shown in FIG. 2, the method according to the embodiment of the present disclosure includes:

Step 201: acquiring the most current locations of all the users who participate in sharing their locations. More specifically, displaying the most current locations of all the users who participate in sharing their locations in viewable region on the map requires acquiring the most current locations of all the users who participate in sharing their locations first. How the most current locations of all the users who participate in sharing their locations are acquired is not limiting by the embodiment of the present disclosure. In practice, the most current locations of all the users who participate in sharing their locations may be acquired by using satellite positioning technology, such as the GPS. Alternately, the most current locations of all the users who participate in sharing their locations may also be acquired according to the received most current locations directly sent from the terminals of the users, etc.

There may be many ways to trigger acquiring the most current locations of all the users who participate in sharing their locations, in practice, including but not limited to acquiring adjusting instruction of the viewable region on the map which displays the most current locations of all the users who participate in sharing their locations.

There are many ways to acquire adjusting instruction of the viewable region on the map, such as, but not limited to the following ways:

A first way: since the number of the users who participate in sharing their locations may change at any time (e.g., new users may be added and may share their most current locations, and existing users may exit from sharing their locations at any time). Therefore, adjusting instruction of the viewable region on the map may be acquired according to whether the number of users who participate in sharing their locations has changed or not. Increasing or decreasing of the number of users who participate in sharing their locations may both trigger the acquiring of the adjusting instruction of the viewable region on the map.

A second way: since the locations of each of the users who participate in sharing their locations may change at any time (for reasons previously mentioned), the most current locations of all the users who participate in sharing their locations may need to be acquired and updated again with the changes of the locations from each of the users who participate in sharing their locations. Therefore, the adjusting instruction of the viewable region on the map may be acquired and updated according to whether the locations from each of the users who participate in sharing their locations may be changed or not.

A third way: adjusting instruction of the viewable region on the map may be acquired according to whether to receive the instruction to adjust the viewable region on the map.

There may be many ways to acquire adjusting instruction of the viewable region on the map according to whether to receive the instruction to adjust the viewable region on the map. For example, a button may be set on a map interface. When detecting that the button is pressed or clicked, it may be determined that the instruction to adjust the viewable region on the map is received. That means that the adjusting instruction for acquiring the viewable region on the map is being triggered.

Of course, the above three ways to acquire adjusting instruction of the viewable region on the map may be individually performed or may be performed in combinations. Therefore, acquiring the adjusting instruction of the viewable region on the map may be according to one or any combination of the aforementioned three ways.

For example, if the number of users who participate in sharing their locations is increased by one, and the location of a user who participates in sharing his location has changed at the same time, then acquiring adjusting instruction of the viewable region on the map may be according to a combination of the first way and the second way.

Preferably, after acquiring the most current locations of all the users who participate in sharing their locations, the location information of the most current locations of all the users who participate in sharing their locations may also be marked on the map. In detail, the contents of the location information of the most current locations of all the users who participate in sharing their locations may be many. For example, the contents of the location information may include, but not limit to the user avatar, nickname, location coordinates, etc.

Preferably, after acquiring the most current locations of all the users who participate in sharing their locations, a position collection nay be set to represent the most current locations of all the users who participate in sharing their locations. For example, the position collection may be set as locations (loc1, loc2, loc3, . . . ). These loc1, loc2, loc3 . . . may represent the most current locations of all the users who participate in sharing their locations, respectively. The ways to represent most current locations of all the users who participate in sharing their locations is not limiting by the embodiment of the present disclosure.

In practice, latitude and longitude coordinate readings may be used to represent the most current locations of all the users who participate in sharing their precise locations. That is, each element in the collection may include the two parameters of latitude and longitude (lat, long).

Step 202: determining a starting location on a map, creating a starting region centered on the starting location. More specifically, a starting region may be created in advance as a reference for all the most current locations of all the users who participate in sharing their locations to be displayed on a viewable region on the map. Afterwards, all the most current locations of all the users who participate in sharing their locations may be displayed on a viewable region on the map through expanding (i.e., enlarging the geographical boundaries) the starting region. Wherein, when creating the starting region, a center may be set for the starting region first, therefore, a starting location may be determined on the map. The starting location may be set and determined as the center of the starting region, and a starting region may be centered on the starting location as created.

The ways to determine a starting location on the map is not limited by the embodiment of the present disclosure. In practice, the determining of a starting location on the map may include but not limit to the following:

A first way: since all the users who participate in sharing their locations might have already chosen a common destination to reach, or might have chosen a landmark location of common interest before sharing their locations. That is to say, all the users who participate in sharing their locations may each determine a common POI (Point of Interest). At the moment, since the most current locations of all the users who participate in sharing their locations may be related to the same POI, therefore, the corresponding location on the map to the POI may be determined in advance by all the users who participate in sharing their locations as being a starting location.

A second way: in order to enable users to acquire the most current locations of their own and of all the users who participate in sharing their locations in real time, when determining starting location, the corresponding location on the map to the most current location of one of the users who participate in sharing their locations may be determined as being a starting location. For example, the location of a corresponding user to the first position in the position collection may be set as a starting location. Of course, the locations of corresponding users to the other positions in the position collection may also be chosen as a starting location.

When determining a corresponding location on the map to be the most current location of one of the users who participate in sharing their locations as the starting location, the chosen user may be the corresponding user to the current terminal, also may be any one of the users who participate in sharing their locations.

It should be noted that if the most current location of one of the users who participate in sharing their locations is determined to be the corresponding starting location on the map, then when the user drops out of sharing his/her locations, is new location from among the remaining users who participate in sharing their locations would need to be re-determined and updated as being the new starting location again.

In addition, the method of creating a starting region centered on the starting location is not limited by the embodiment of the present disclosure. There may be other methods such as using shapes as the starting region having the starting location as the center. For example, a circular region centered on the starting location may be created as the starting region; a square area centered on the starting location may also be created as the starting region, etc. The size of the starting region may not be limited by the embodiment of the present disclosure. For example, if the starting region is a circular region, the radius of the circular region may be set as 100 m, 1 km, and so on. If the starting region is a square region, the length and width of the square region may be both set as 100 m, 1 km, and so on.

Step 203: gradually expanding the starting region in accordance with the most current location of each of the users who participate in sharing their locations, until a target region including the most current locations of all the users who participate in sharing their locations is acquired.

After creating a viewable region centered on the starting location, in order to display on the terminal the most current locations of all the users who participate in sharing their locations in the viewable region on the map, the starting region may gradually be expanded to display more or even all the users at their most current locations in the expanded region view. For illustration purposes, the expanding region may include the most current locations of all the users who participate in sharing their locations by defining a target area or target region.

The scope of the target region may be acquired through the gradual expanding of the starting region to include the most current locations of each of the users who participate in sharing their locations. In practice, the map which displays the target area may include the most current locations of all the users who participate in sharing their locations. In practice, the ways to acquire the target region may not be limited by the following ways:

A first way: a starting region having the starting region being the center may gradually and evenly expand, until a target region including the most current locations of all the users who participate in sharing their locations has been acquired. That is, the center of the starting region may be kept unchanged, and the starting region may gradually and evenly expand until the target region includes the most current locations of all the users who participate in sharing their locations. If the starting region is a square area, when expanding the starting region, the length and width may both expand by the same distance.

A second way: a starting region may gradually be expanded in accordance with a position relationship of the most current location of each of the users who participate in sharing their locations, until a target region which includes the most current locations of all the users who participate in sharing their locations has been acquired. For example, if a user's most current location is located at the left of the starting region, then the left half part of the starting location may be expanded until the user's most current location has been included within the expanded starting region. If a user's most current location is above the starting region, then the upper part of the starting location may be expanded until the user's most current location has been included within the expanded starting region, and so on.

Preferably, once the gradual expanding of the starting region in accordance with the most current location or each of the users who participate in sharing their locations until a target region including the most current locations of all the users who participate in sharing their locations is acquired, a starting region may be gradually expanded in accordance with an order following each of the users who participate in sharing their locations in the set position collection. Specifically, the first expansion of the starting region may be made in accordance with the most current location of the first user in the position collection until the most current location of the first user is displayed on the expanded starting region; then, the second expansion of the starting region is made in accordance with the most current location of the second user in the position collection until the most current location of the second user is displayed on the expanded starting region, and so forth. However, if it is determined that the most current location of the second user is already within the region acquired in the first expansion of the starting region before the second expansion of the starting region, the second expansion of the starting region would be unnecessary. Instead, expansion of the starting region in accordance with the most current location of the third user in the position collection may proceed. In addition, the expansion of the starting region made in accordance with the most current locations of other users in the position collection may proceed in accordance with the most current location of the first user, second user, and third user in the order sequence of most current location position collection.

Figure 3:
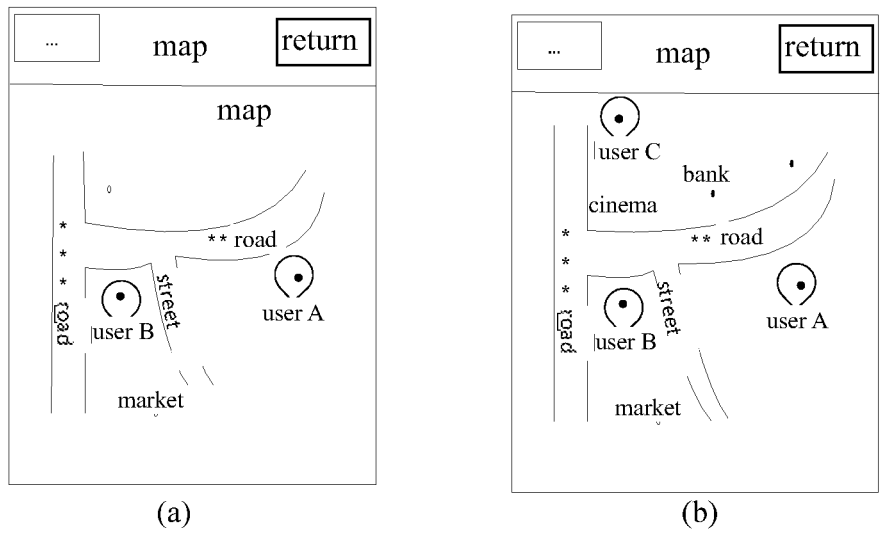
FIG. 3 is an exemplary map showing a first viewable region on the map, according to the second embodiment of present disclosure.

FIGS. 3(a)-3(b) may provide an illustration to the embodiments of the method disclosed, using an increasing number of users who participate in sharing their locations. Since the size of the target region is related to the number of the users who participate in sharing their locations, when the number of the users who participate in sharing their locations increases, it may be possible that the most current location of the new user may not be in the target region currently determined. If so, there may be a need to expand the starting region, until the most current location of the new user may be included in the expanded starting region.

As shown in FIG. 3(a), supposed that there are two users (i.e., user A and user B) participating in sharing their locations. The most current locations of user A and user B who participate in sharing their locations may be displayed as a viewable region on the map (as shown in FIG. 3(a)). As the number of users (e.g., user C may be added) participating in sharing their locations increases, it may be necessary to determine whether the most current locations a user C may be within the target region determined according to user A and user B. If the most current locations of user C may be within the target region determined according to user A and user B, it would not be necessary to determine the target region again. However, if the most current locations of user C is not within the target region of user A and user B, there may be a need to expand the starting region until the most current locations of user C may be included in the expanded starting region as a new target region.

As shown in FIG. 3(b), it may be shown that when the most current locations of user C is not in the target region as shown in FIG. 3(a) determined according to use A and use B, expanding the starting region further until the most current location of the user C is included in the target region re-determined through expansion of the starting region. In comparing FIG. 3(a) with FIG. 3(b), one may notice that the scope of the viewable region on the map displayed according to the target region in FIG. 3(a) is larger than the scope of the viewable region on the map displayed according to the target region in FIG. 3(b), which shows that the most current locations of all the users (i.e., user A to user C) who participate in sharing their locations may be acquired through the viewable region on the map. Therefore, an increase in the number of users would trigger an adjusting instruction to the viewable region on the map.

It should be noted that when the number of users who participate in sharing their locations decreases, in order to ensure that the most current location of each of the users who participate in sharing their locations may be clearly displayed within the viewable region on the map, the size of the target region may need to be adjusted, and the viewable region on the map may also be adjusted accordingly.

For example, using user C in the above example in FIG. (3b) to illustrate, if user C has dropped out of the sharing location, the locations of user A and user B may still be displayed according to the target region currently determined. In order to ensure a more clear or detail view on the most current locations of user A and user B, the current target region be reduced by zooming in to obtain a better resolution with better detail on the most current locations of user A and user B. Of course, if the most current location of user C is outside the target region (as shown in FIG. 3(a)), there would no need to adjust the size of the target region.

Figure 4:
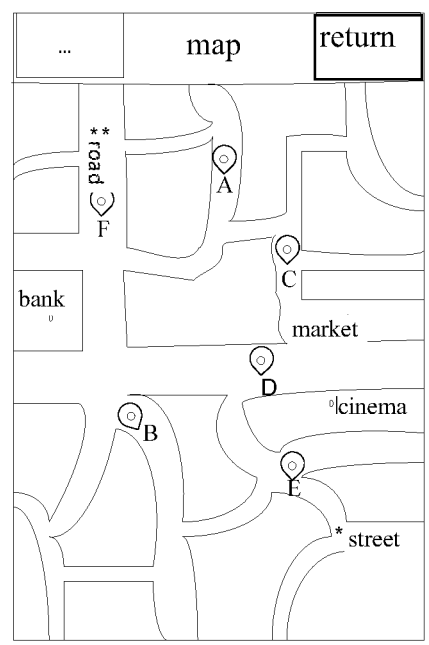
FIG. 4 is an exemplary map showing a second viewable region on the map, according to the second embodiment of present disclosure.

Step 204: determining and displaying a viewable region on the map in accordance with the target region. As shown in FIG. 4, a target region including the most current locations of all the users (user A, user B, user C, user D, user E and user F) who participate in sharing their locations may be determined through the above steps and the viewable region on the map may be displayed.

Step 205: expanding the target region according to a preset multiple, determining and displaying the viewable region on the map in accordance with the target region after being expanded.

This step may be applicable when the locations of some users who participate in sharing their locations in the viewable region on the map may be at the edge of the target region, or outside the target region, so that the most current locations may not be accurately acquired. Therefore, after acquiring the target region through the above steps, the target region may be expanded according to a preset multiple, and displaying the viewable region on the map in accordance with the expanded target region (such expanding from FIG. 3(a) to FIG. 4). For example, the preset multiple may be 1.5 times, 2 times, and so on. The size of the preset multiple is not particularly limiting by the embodiment of the present disclosure.

Preferably, after determining and displaying a viewable region on the map in accordance with the target region, in order to make a user who participates in sharing his location definite about the path to reach the most current location of any other user who participates in sharing his/her location, the path between the most current locations of each user may be determined according to the most current locations of each user displayed on the viewable region on the map, that is displaying a path between the most current locations of each user in the viewable region on the map.

Figure 5:
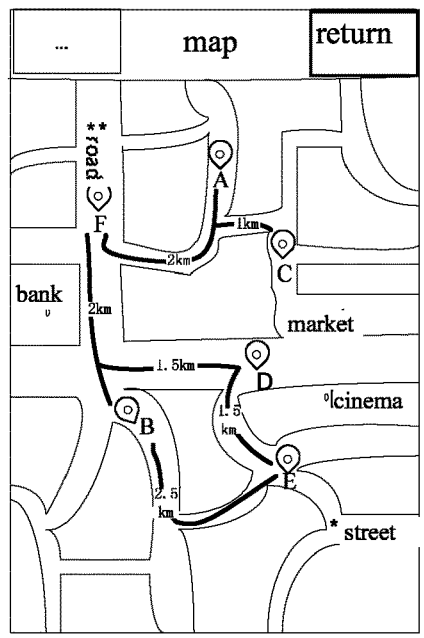
FIG. 5 is an exemplary map showing a third viewable region on the map, according to the second embodiment of present disclosure.

For example, FIG. 5 illustrates a map displaying the respective paths between the most current locations of each user in the viewable region on the map. The hold line in FIG. 5 may represent a preferred path between the most current locations of each of the respective users who participate in sharing their locations. Displaying the path between the most current locations of each user in the viewable region on the map provides additional convenience for the users to view a preferred path to reach the most current location or any other user who participate sharing his locations.

After determining a path between each respective user according to the most current locations displayed on the viewable region on the map, a corresponding distance between each respective user may be determined according to the most current locations of each user. There may be different ways to determine the distance between each respective user. In practice, the actual distance between each respective user may be calculated according to the chosen route with actual distance between the most current locations of each user as mapped out by a navigation application (e.g., Google map).

For example, as shown in FIG. 5, the distance (based on the chosen route) between the most current location of user A and the most current location of user F may be determined to be 2 km; the distance between the most current location of user B and the most current location of user E may be determined to be 25 km.

Suppose all the users who participate in sharing their locations are mutual friends of each other, and they may have made a pre-arranged appointment to go to a preset target location together (e.g., a cinema or a restaurant) at a certain time. Due to different traffic condition, by viewing the most current location of each user and the distance to the preset target location, all the users may be provided with an estimated distance and how long it would take for each respective user to arrive the preset target location using the viewable region displayed on the map on the terminal. Alternately, suppose there is a traffic jam, or if the preferred path is closed due to road repair or due to special street event, the viewable region displayed on the map may display an alternate path with corresponding distance information to go to the preset target location (as shown in FIG. 6).

Figure 6:
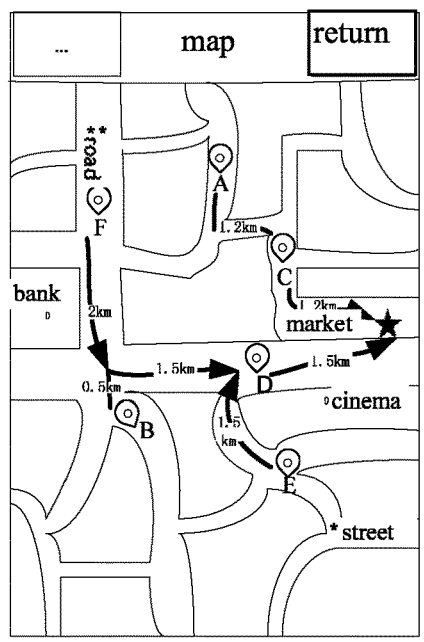
FIG. 6 is an exemplary map showing a fourth viewable region on the map, according to the second embodiment of present disclosure.

For example, as shown in FIG. 6, the location as shown by the star may be the preset target location where all the users who participate in sharing their locations may agree to go. The content represented by the bold line in FIG. 5 may indicate the respective paths from the most current locations of each respective user to reach the preset target location, and thus increasing the efficiency of coordinating appointments for multiple users and provide preferred paths, distance and arrival time information to each user to reach the preset target location.

The ways to determine the paths, the distance from the most current location of each user to the preset target location according to the path from the most current location of each user to the preset target location is not limited by embodiments of the present disclosure.

For example, as shown in FIG. 6, the distance from the most current location of user D and the preset target location may be 1.5 km, while user A may need to reach the most current location or user C (1.2 km) before reaching the preset target location (which is another 1.2 km). Therefore, the distance between the most current location of the user A and the preset target location is 2.4 km.

Figure 7:
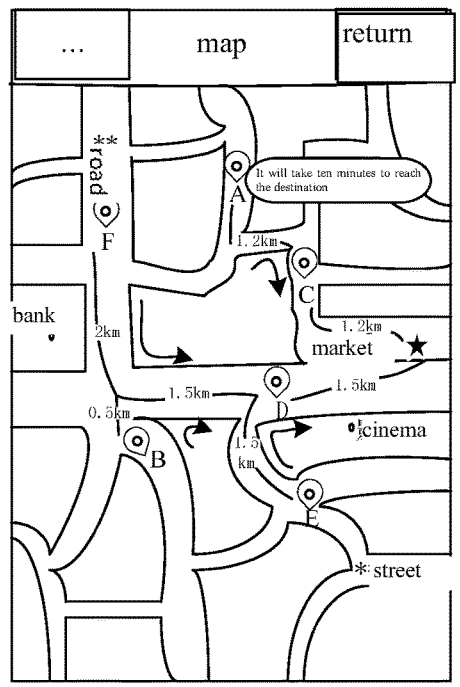
FIG. 7 is an exemplary map showing a fifth viewable region on the map, according to the second embodiment of present disclosure.

Further, FIG. 7 displays the time taken (e.g., 10 minutes) for A to travel from its most current location to the preset target according to the distance (i.e., 2.4 km) and according to the traveling speed of user A (e.g., in a vehicle), as shown in the viewable region on the map. The traveling speed of A would of course depend upon the traffic condition of the chosen path. User A therefore, may alternately choose a different path and recalculate its updated path distance and estimated time taken to reach the preset target location.

There are many ways to display the time taken to go from the most current location of each user to the preset target location in the viewable region on the map. For example, the time taken to go from the most current location of each respective user to the preset target location may be displayed through popping a prompt box. In practice, when a user need to determine the time taken to reach the preset target locations, the user may simply click the user's most current location bubbles. That is, when the terminal detects the operation of clicking bubbles, it may be determined that the time taken to go from the most current location of each user to the preset target location may need to be displayed on a prompt box (701).

For example, as shown in FIG. 7, if the user of the current terminal may need to determine the time taken to reach the preset target location (i.e., shown as a star location), the user may click user A's most current location bubble (shown as a bubble shove A). When the terminal detects user A's most current location bubbles is clicked, an estimated time taken to reach the preset target location may be displayed on the prompt box (701).

Preferably, when the paths from the respective different users to the preset target locations may overlap, this may indicate that the respective different users may also agree to go to the preset target location together. Therefore, after determining the distance from the most current location of each user to the preset target location according to the path from the most current location of each user to the preset target location, a distance message may be sent to the respective terminals used by each respective user who reaches the preset target location through the same path, which may further prompt to show the distance between the most current locations of the different respective users to choose to wait together for the other users who may be taking the same path, thus achieving going to the preset target location together. This feature may be beneficial when the target location may be a crowded place with multiple levels, thus cut down time wasted looking for one another. The ways to sending a distance message to the terminal used by the users who reach the preset target location through the same path is not particularly limited in the embodiments of the present disclosure.

Still as shown in FIG. 7, since the path from user A to the preset target location and the path from user B to the preset target location may be partially overlapped, a distance message may be sent to terminal used by user A and terminal used by user C, respectively, to prompt the distance between the most current location of user A and most current location of user B. After receiving the distance message by user A and user B, it may be negotiated that user C may wait for user A to go to the preset target location together.

Preferably, since there are many paths from the same user to the preset target location, therefore, the path currently selected by the users to reach the preset target location may not be an optimal path, or one of the users may select a wrong path because of walking in a wrong direction. Therefore, after determining the path from the most current locations of each user to the preset target location according to the most current locations of each respective user displayed on the viewable region on the map, the users who have deviated from the path may be determined according to their most current locations, and sending a deviation reminder message to the terminal used by the users who have deviated from the path.

When determining the users who have deviated from the path according to the most current locations of each user, it may be achieved through judging whether the most current location of the user is in the path to the preset target locations displayed on the viewable region on the map. When judging that the most current location of the user is not in the path to the preset target locations displayed on the viewable region on the map, the user may be determined as the user who has deviated from the path. Optionally, the preset target location may be considered as the center of a circle, the distance from the most current locations of each user to the preset target location may be considered as a radius, setting the corresponding reference range for each user, if a user's most current location is not in the scope of the corresponding reference range, the user may be determined as the user who has deviated from the path. Of course, the corresponding reference range may be set through other ways for the users; the ways to set the corresponding reference range is not particularly limited in embodiment of the present disclosure.

There are many ways to send a deviation reminder message to the terminal used by the users deviated from the path. For example, the deviation reminder message may be sent to the terminal used by the users who have deviated from the path through SMS as well as Instant Messaging System, etc.

The methods according to the embodiment or the present disclosure, acquiring the target regions of the most current locations of all the users who participate in sharing their locations through expanding the target region, and determining and displaying a viewable region on the map in accordance with the target region, making sure that the most current locations of all the users who participate in sharing their locations may be acquired in the displayed viewable region on the map, increasing efficiency of acquiring the most current locations of all the users who participate in sharing their locations.

Embodiment 3

Figure 8:
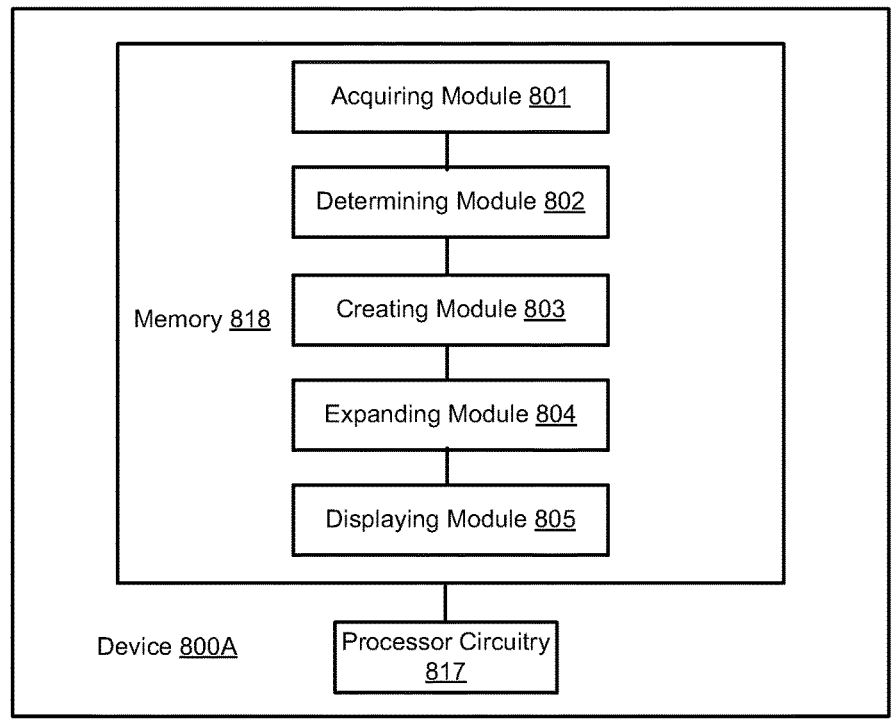
FIG. 8 depicts an exemplary structure of a device for simultaneously displaying multiple users' locations on a map, according to a third embodiment of present disclosure.

The embodiment of the present disclosure provides a device (800A) for simultaneously displaying multiple users' locations on a map, referring to FIG. 8, the device (800A) may include at least a processor with circuitry (817) operating in conjunction with at least a memory (818) storing codes to be executed to perform functions as a plurality of modules and units, wherein the plurality of modules and units may include:

an acquiring module (801), configured to acquire the most current locations of all the users who participate in sharing their locations;

a determining module (802), configured to determine a starting location on the map;

a creating module (803), configured to create a starting region centered on the starting location;

an expanding module (804), configured to gradually expand the starting region in accordance with the most current location of each of the users who participate in sharing their locations, until a target region which includes the most current locations of all the users who participate in sharing their locations is acquired; and a displaying module (805), configured to determine and display a viewable region on the map in accordance with the target region.

Preferably, the expanding module (804) is further configured to expand the target region according to a preset multiple; and the displaying module (805) is further configured to determine and to display the viewable region on the map in accordance with the target region after being expanded.

Preferably, the acquiring module (801) further includes: a first acquiring unit, configured to acquire an adjusting instruction of the viewable region on the map; and a second acquiring unit, configured to acquire most current locations of all the users who participate in sharing their locations according to the adjust instruction.

Preferably, the first acquiring unit is configured to acquire the adjusting instruction of the viewable region on the map according to whether the number of users who participate in sharing their locations and the locations of users who participate in sharing their locations has changed, and whether at least one triggering situation set in the adjusting instruction of the viewable region on the map is received.

Preferably, the determining module (802) is configured to determine a location which corresponds to a point of interest on the map as the starting location, with the point of interest being predetermined by all the users who participate in sharing their locations.

Preferably, the determining module (802) is configured to determine a location on the map which corresponds to the most current location of the user who is one of the users who participate in sharing their locations as the starting location.

Preferably, the expanding module (804) is configured to expand the starting region gradually centered on the center of the starting region before expanding in accordance with the most current location of each of the users who participate in sharing their locations, until a target region which includes most current locations of all the users who participate in sharing their locations is acquired.

Preferably, the expanding module (804) is configured to expand the starting region gradually in accordance with the location relationship between the starting region and the most current location of each of the users who participate in sharing their locations, until a target region which includes most current locations of all the users who participate in sharing their locations is acquired.

Preferably, the determining module (802) is configured to determine paths among the most current locations of each of the users according to the most current locations of each of the users displayed on the viewable region on the map; and the displaying module (805) is configured to display the paths among the most current locations of each of the users in the viewable region on the map.

Preferably, the determining module (802) is further configured to determine the distances among the most current locations of each of the users according to the paths among the most current locations of each of the users; and the displaying module (805) is configured to display the distances among the most current locations of each of the users in the viewable region on the map.

Preferably, the determining module (802) is further configured to determine the paths between the preset target locations and the most current locations of each of the users according to the most current locations of each of the users displayed on the viewable region on the map; and the displaying module (805) is further configured to display the paths between the preset target locations and the most current locations of each of the users in the viewable region on the map.

Preferably, the determining module (802) is further configured to determine the distances between the preset target locations and the most current locations of each of the users according to the respective paths between the preset target locations and the most current locations of each of the users; and the displaying module (805) is further configured to display the distances between the preset target locations and the most current locations of each of the users in the viewable region on the map.

Preferably, the determining module (802) is further configured to determine the time spend form the most current locations of each of the users to the preset target locations according to the respective distances between the preset target locations and the most current locations of each of the users; and the displaying module (805) is further configured to display the time spend form the most current locations of each of the users to the preset target locations in the viewable region on the map.

Figure 9:
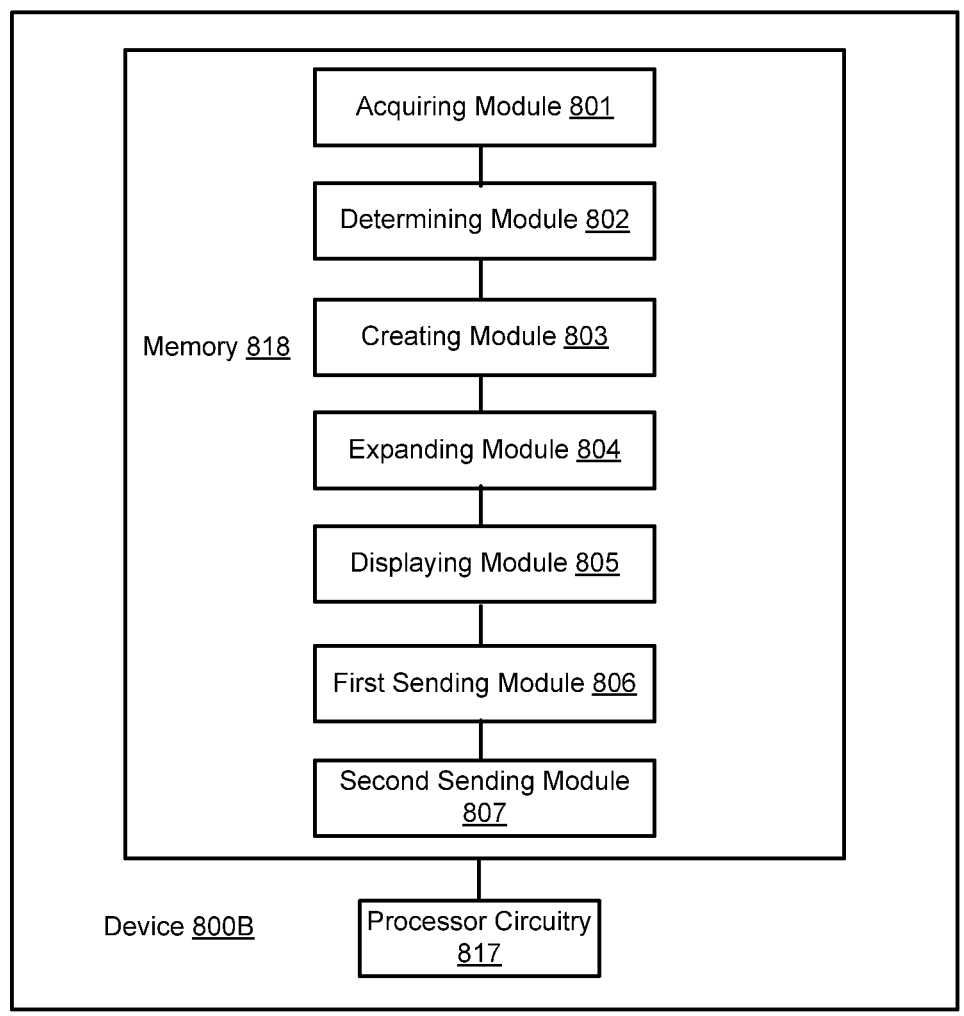
FIG. 9 depicts another exemplary structure of a device for simultaneously displaying multiple users' locations on a map, according to a third embodiment of present disclosure.

Preferably, referring to FIG. 9, the device (800B) further includes: a first sending module (806), configured to send distance prompts to the terminals used by users who arrive the preset target location through the same paths.

Preferably, the determining module (802) is further configured to determine users who deviate from the respective paths according to the most current locations of each of the users.

The device (800B) further includes: a second sending module (807), configured to send path deviation prompts to the terminals used by the users who deviate from the respective paths.

The device (800B) according to embodiment or the present disclosure may be used for acquiring a target region which includes the most current locations of all the users who participate in sharing their locations through expanding the starting region, determining and displaying a viewable region on the map in accordance with the target region, making sure that the users may acquire the most current locations of users participating in sharing location, thus, the efficiency of acquiring the most current locations of users participating in sharing location may be improved.

Figure 10:
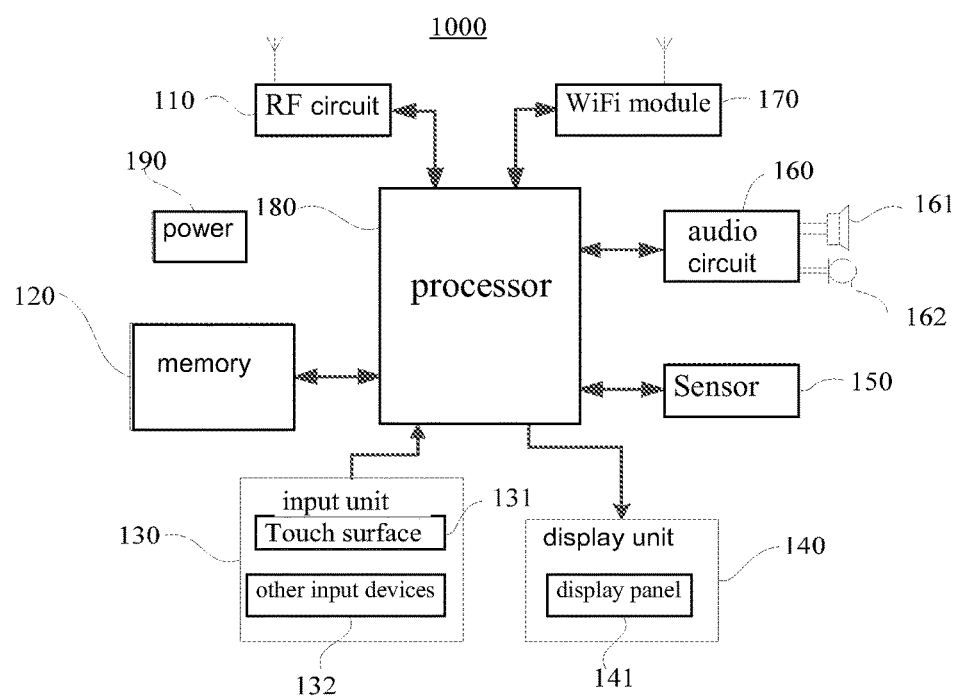
FIG. 10 depicts an exemplary structure of a terminal for simultaneously displaying multiple users' locations on a map, according to a fourth embodiment of present disclosure.

FIG. 10 is an exemplary structure of a terminal (1000) for simultaneously displaying multiple users' locations on a map, according to a fourth embodiment of present disclosure. In practice, the terminal (1000) may be disclosed as the device (800A) or the device (800B) itself, as previously described in FIGS. 8-9. Alternately, the device (800A) or the device (800B) may be as a portion of the terminal (1000) only.

The terminal (1000) may include RF (Radio Frequency) circuit (110), a memory (120) including one or more than one computer-readable storage mediums, an input unit (130), a display unit (140), a sensor (150), an audio circuitry (160), WiFi (Wireless Fidelity) module (170), a processor (180) including one or more than one processing core, and a power supply (190), etc. It is understood by those skilled in the art that, the termination structure shown in FIG. 10 does not constitute a limitation to the terminal, which may include more or fewer components than shown, or a combination of some components, or a different arrangement of components.

The RF circuitry (110) may be used to receive and send message, or receive and transmit signals during a call, in particular, the base station receives the downlink information, and forwards them to the one or more than one processors (180) for being processed; further, the uplink data is sent to the base station. Typically, the RF circuit (110) includes, but is not limited to an antenna, at least one amplifier, a tuner, one or more oscillators, a subscriber identity module (SIM) card, a transceiver, a coupler, LNA (Low Noise Amplifier), and a diplexer, etc.

In addition, the RF circuitry (110) may communicate with other devices through a wireless network. The wireless communication may use any communications standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service, short message Service), and the like.

The Memory (120) may be used to store software programs and modules. The processor (180) may execute various functions application and data processing of terminal (1000) by running software programs and modules in the memory (120). The memory (120) may include, a storage program area and a storage date area, wherein the storage program area may store an operating system, the application required by at least one function (such as sound playback, image playback, etc.). The storage data area may store data (such as audio data, phone book, etc.) created according to the usage of the terminal (1000). In addition, the memory (120) may include high-speed random access memory, and may also include non-volatile memory, such as at least one disk storage device, a flash memory device, or other easily Volatile solid-state memory devices. Accordingly, the memory (120) may also include a memory controller to provide with the processor (180) and an input unit (130) which accesses the memory (120).

The input unit (130) may be used to receive input numbers or characters of the message, and generates optical signal inputs which are related to the user setting and the function control to the keyboard, the mouse, the joystick, or the trackball. Specifically, the input unit (130) may include a touch sensitive surface (131), and other input devices (132). The touch sensitive surface (131) also known as a touch screen display or touch screen panel, may collect touch screen operations of the user upon or near it (such as operations of user using finger, stylus and any other suitable object or attachment on or near the touch sensitive surface (131)), and may drive the corresponding connecting device according to a preset program.

Optionally, the touch sensitive surface (131) may include a touch detection device and a touch controller. The touch detection device detects the position a user touches, detects and sends the signal brought by the touch operation to the touch controller; the touch controller receives touch information from the touch detecting device, and converts it into contact coordinates, and the sends the contact coordinates to the processor (180), and may receive and execute commands sent by the processor (180). Further, resistive, capacitive, infrared and surface acoustic wave, and many other types of touch panel may be used to achieve the touch sensitive surface (131). In addition to the touch sensitive surface (131), the input unit (130) may also include other input devices (132). In detail, the other input devices (132) may include but are not limited to one or more of the physical keyboard, function keys (such as volume control keys, key switches, etc.), the trackball, the mouse, the operating lever, and so on.

The display unit (140) may be used to display information input by the user, or information provided to the user, and a variety of graphical user interface of the terminal (1000). The graphical user interface may consist of graphics, text, icons, video, and any combination thereof. The display unit (140) may include a display panel (141); optionally, of LCD (Liquid Crystal Display), OLED (Organic Light-Emitting Diode) types. Other form of display may be used to configure the display panel (141). Further, the touch sensitive surface (131) may cover the display panel (141), the touch sensitive surface (131) sends the touch operations to the processor (180) after detecting there are the touch operations existing on or near it, and then the processor (180) provides corresponding visual output in the display panel (141) according to the type of touch event. Although the touch panel (131) and the display panel (141) may achieve the input and output functions of the terminal (1000) as two separate component as shown in FIG. 10. In some embodiments, the touch sensitive surface (131) and the display panel (141) may be integrated together to achieve the input and output functions of the terminal (1000).

The terminal (1000) may further include at least one sensor (1150), such as optical sensors, motion sensors, and other sensors. In detail, the optical sensor may include ambient light sensor and proximity sensor, wherein the ambient light sensor may adjust the brightness of the display panel (141) according to the brightness of the ambient light, the proximity sensor may close the display panel (141) and/or backlight, when the terminal (1000) moves nearby the ears. As one type of the motion sensor, an acceleration sensor may detect the magnitude of acceleration of the respective directions (typically axis, in general), the direction and speed of gravity may be detected by the acceleration sensor when stationary, the acceleration sensor may be used to identify terminal posture applications (such as vertical screen switching, related games, magnetometer calibration posture), vibration to recognize related functions (such as pedometers, percussion), etc.; barometers, hygrometers, thermometers, infrared sensors, and other sensors may be configured to the terminal 1100, which will not be repeated here.

An audio circuit (160), a speaker (161), a microphone (162) may provide audio interface between the user and the terminal (1000). The audio circuitry (160) may send the electrical signal which is transformed from the received audio data by the audio circuitry (160) to the speaker (160), the speaker (161) transforms the electrical signal into a sound signal, and outputs it; on the other hand, the microphone (162) may transform the collected sound signal into an electrical signal, the audio circuit (160) transforms the received electrical signal into audio data and outputs it to the processor (1180) to be processed, after processing by the processor (180), the RF circuit (110) sends it to the other terminal, or outputs audio data to the memory (120) for further processing. Audio circuitry (160) may also include ear bud jack, headset and peripherals to provide a communication terminal (1000).

WiFi is a short-range wireless transmission technology, the terminal (1000) helps users send and receive email, browse the web, and access streaming media, and the like through WiFi module (170); it provides users with wireless broadband Internet access. Although FIG. 10 shows a WiFi module (170), it should be understood that it is not an integral part of the terminal (1000); it may be omitted as required within the scope which is not changing the essence of disclosure.

The processor (180) is the control center of the terminal (1000), connects various parts of the terminal by using various interfaces and connections, executes various functions and processing data of the terminal (1000) by running or executing software program and/or module stored in the memory (120) and by calling the data stored in the memory (120), and thus monitor the terminal overall. Optionally, the processor (180) may include one or more processing units. Preferably, the processor (180) may integrated the application processor and the modem processor, wherein the application processor mainly process operating system, user interface, and applications program, and so on, the modem processor mainly process wireless communication. It should be understood that the above processor may also be not integrated into the processor 180.

The terminal (1000) further includes a power supply (190) (such as batteries) which supplies power to each part, preferably, the power supply may be connected logically with the processor 180 through a power management system, and thus achieve functions of managing charging, discharging and power consumption through the power management system. The power supply (190) may also include one or more AC or DC powers, a recharging of any component of the system, a power failure detection circuit, a power converter or inverter, power status indicators, and the like.

Although not shown, the terminal (1000) may also include a camera, Bluetooth module, etc., which is not repeated here anymore. Specifically in the present embodiment, the display unit of the terminal is a touch screen display, the terminal further includes a memory, and one or more than one program, wherein the one or more programs is stored in the memory, and configured to be performed by one or more processing. The program contains one or more instructions for performing the following operations: acquiring the most current locations of all the users who participate in sharing their locations; determining a starting location on a map, creating a starting region centered on the starting location, and gradually expanding the starting region in accordance with the most current location of each of the users who participate in sharing their locations, until a target region including the most current locations of all the users who participate in sharing their locations is acquired; and determining and displaying a viewable region on the map in accordance with the target region.

Assuming that the above is a first possible embodiment, according to the second possible embodiment which is implemented based on the first possible embodiment, the memory of the terminal further includes instructions for performing the following operations; after the gradual expanding of the starting region in accordance with the most current location of each of the users who participate in sharing their locations, until a target region including the most current locations of all the users who participate in sharing, their locations is acquired, the method further includes: expending the target region according to a preset multiple; and wherein the determining and displaying a viewable region on the map in accordance with the target region includes: determining and displaying the viewable region on the map in accordance with the target region after being expanded.

According to the third possible embodiment which is implemented based on the first possible embodiment, the memory of the terminal further includes instructions for performing the following operations: acquiring the most current locations of all the users who participate in sharing their locations includes: acquiring an adjusting instruction of the viewable region on the map, and acquiring the most current locations of all the users who participate in sharing their locations according to the adjust instruction.

According to the fourth possible embodiment which is implemented based on the third possible embodiment, the memory of the terminal further includes instructions for performing the following operations: acquiring an adjusting instruction of the viewable region on the map includes: acquiring the adjusting instruction of the viewable region on the map according to whether the number of users who participate in sharing their locations and the locations of users who participate in sharing their locations has changed, and whether at least one triggering situation set in the adjusting instruction of the viewable region on the map is received.

According to the fifth possible embodiment which is implemented based on the first possible embodiment, the memory of the terminal further includes instructions for performing the following operations: determining a starting location on the map includes: determining a location which corresponds to a point of interest on the map as the starting location, with the point of interest being predetermined by all the users who participate in sharing their locations.

According to the sixth possible embodiment which is implemented based on the first possible embodiment, the memory of the terminal further includes instructions for performing the following operations: determining a starting location on the map includes: determining a location on the map which corresponds to the most current location of the user who is one or the users who participate in sharing their locations as the starting location.

According to the seventh possible embodiment which is implemented based on the first possible embodiment, the memory of the terminal further includes instructions for performing the following operations: the gradual expanding of the starting region in accordance with the most current location of each of the users who participate in sharing their locations, until as target region including the most current locations of all the users who participate in sharing their locations is acquired, includes: gradually expanding the starting region centered on the center of the starting region before expanding in accordance with the most current location of each of the users who participate in sharing their locations, until a target region which includes the most current locations of all the users who participate in sharing their locations is acquired.

According to the eighth possible embodiment which is implemented based on the first possible embodiment, the memory of the terminal further includes instructions for performing the following operations: gradually expanding the starting region in accordance with the most current location of each of the users who participate in sharing their locations, until a target region including the most current locations of all the users who participate in sharing their locations is acquired, includes: gradually expanding the starting region in accordance with the location relationship between the starting region and the most current location of each of the users who participate in sharing their locations, until a target region which includes most current locations of all the users who participate in sharing their locations is acquired.

According to the ninth possible embodiment which is implemented based on the first possible embodiment, the memory of the terminal further includes instructions for performing the following operations: after determining and displaying a viewable region on the map in accordance with the target region, the method further includes: determining respective paths among the most current locations of each of users according to the most current locations of each of the users displayed on the viewable region on the map; and displaying the respective paths among the most current locations of each of the users in the viewable region on the map.

According to the tenth possible embodiment which is implemented based on the ninth possible embodiment, the memory of the terminal further includes instructions for performing the following operations: after determining respective paths among the most current locations of each of the users according to the most current locations of each of the users displayed on the viewable region on the map, the method further includes: determining respective distances among the most current locations of each of the users according to the paths among the most current locations of each of the users; and displaying the respective distances among the most current locations of each of the users in the viewable region on the map.

According to the eleventh possible embodiment which is implemented based on the first possible embodiment, the memory of the terminal further includes instructions for performing the following operations: after determining and displaying a viewable region on the map in accordance with the target region, the method further includes: determining the respective paths between the preset target locations and the most current locations of each of the users according to the most current locations of each of the users displayed on the viewable region on the map; and displaying the respective paths between the preset target locations and the most current locations of each of the users in the viewable region on the map.

According to the twelfth possible embodiment which is implemented based on the eleventh possible embodiment, the memory of the terminal further includes instructions for performing the following operations: after determining the respective paths between the preset target locations and the most current locations of each of the users according to the most current locations of each of the users displayed on the viewable region on the map, the method further includes: determining respective distances between the preset target locations and the most current locations of each of the users according to the respective paths between the preset target locations and the most current locations of each of the users; and displaying the respective distances between the preset target locations and the most current locations of each of the users in the viewable region on the map.

According to the thirteenth possible embodiment which is implemented based on the twelfth possible embodiment, the memory at the terminal further includes instructions for performing the following operations: after determining respective distances between the preset target locations and the most current locations of each of the users according to the respective paths between the preset target locations and the most current locations of each of the users, the method further includes: determining a respective time spent traveling from the most current locations of each of the users to the preset target locations according to the respective distances between the preset target locations and the most current locations of each of the users; and displaying the respective time spent traveling from the most current locations of each of the users to the preset target locations in the viewable region on the map.

According to the fourteen possible embodiment which is implemented based on the twelfth possible embodiment, the memory of the terminal further includes instructions for performing the following operations: after determining respective, distances between the preset target locations and the most current locations of each of the users according to the respective paths between the preset target locations and the most current locations of each of the users, the method further includes: sending respective distance prompts to the terminals used by users who waive the preset target location through the same paths.

According to the fifteenth possible embodiment which is implemented based on the twelfth possible embodiment, the memory of the terminal further includes instructions for performing the following operations: after determining the respective paths between the preset target locations and the most current locations of each of the users according to the most current locations of each of the users displayed on the viewable region on the map, the method further includes: determining users who deviate from the respective paths according to the most current locations of each of the users, and sending path deviation prompts to the terminals used by the users who deviate from the respective paths.

The terminal according to embodiment of the present disclosure is used for acquiring a target region which including the most current locations of all the users who participate in sharing their locations through expanding the starting region, determining and displaying a viewable region on the map in accordance with the target region, making sure that the users may acquire the most current locations of users participating in sharing location, thus, efficiency of acquiring the most current locations of users participating in sharing location is improved.

Embodiment 5

The embodiment of the present disclosure provides a non-transitory computer-readable storage medium, the non-transitory computer-readable storage medium may be a non-transitory computer-readable storage medium arranged in the memory in the aforementioned embodiments; also may be discrete, which means that the non-transitory computer-readable storage medium is not arranged in the terminal. The non-transitory computer-readable storage medium may store one or more than one programs, the one or more than one programs may be used to implement the method for displaying the map by one or more than one processor, and the method includes: acquiring the most current locations of all the users who participate in sharing their locations; determining a starting location on a map, creating a starting region centered on the starting location, and gradually expanding the starting region in accordance with the most current location of each of the users who participate in sharing their locations, until a target region including the most current locations of all the users who participate in sharing their locations is acquired; and determining and displaying a viewable region on the map in accordance with the target region.

Embodiment 6

The embodiment of the present disclosure provides a graphic user interface which is employed on the terminal, with the terminal including a touch screen displayer, a memory, and one or more processors for implementation of one or more than one programs; and the graphical user interface includes performing the functions of acquiring the most current locations of all the users who participate in sharing their locations; determining a starting location on a map, creating a starting region centered on the starting location, and gradually expanding the starting region in accordance with the most current location of each of the users who participate in sharing their locations, until a target region including the most current locations of all the users who participate in sharing their locations is acquired; and determining and displaying a viewable region on the map in accordance with the target region.

The graphical user interface according to embodiment of the present disclosure is used for acquiring a target region which including the most current locations of all the users who participate in sharing their locations through expanding the starting region, determining and displaying a viewable region on the map in accordance with the target region, making sure that the users may acquire the most current locations of users participating in sharing location, thus, efficiency of acquiring the most current locations of users participating in sharing location is improved.

It is important to note that: the device for simultaneously displaying multiple users' locations on a map in the aforementioned embodiment is only illustrated by the division of the functional modules when displaying the map, in practical applications, the aforementioned functions may be assigned and performed by different functional modules as required, which means that the internal structure of the device is divided into different functional modules, to complete all or part of the functionality described above. In addition, the device for displaying the map and the method for displaying the map according to the aforementioned embodiments belongs to the same concept, and their specific implementation processes have been detailed in the methods described.

The modules and units described as separate parts may be or may not be physically separated, and parts displayed as units may be or may not be physical units, that is, they may be located at the same place or be distributed on multiple network units. Some or all of the modules may be selected as needed to attain the objectives of this embodiment. A person with ordinary skills in the art may understand and carry out it without inputting creative effort.

The sequence numbers of the above-mentioned embodiments may be intended only for description, instead of indicating the relative merits of the embodiments. It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive, ROM or flash memory. The computer-executable commands may enable a computer, a server, a smart phone, a tablet or any similar computing device to simultaneously display multiple users' locations on a map.

What is claimed is:

1. A method for simultaneously displaying multiple users' locations on a map, comprising:
    acquiring the most current locations of all the users who participate in sharing their locations;
    determining a starting location on a map, creating a starting region centered on the starting location, and gradually expanding the starting region in accordance with the most current location of each of the users who participate in sharing their locations, until a target region including the most current locations of all the users who participate in sharing their locations is acquired; and
    determining and displaying a viewable region on the map in accordance with the target region,
    determining and displaying on the viewable region on the map, respective chosen paths between each of the users according to the most current locations of each of the users;
    determining and displaying on the viewable region on the map, respective chosen path distances between users who are along the determined respective chosen paths, and
    determining and displaying on the viewable region on the map, respective chosen paths and chosen path distances between a preset target location and at least one of the users who is most proximal to the preset target location according the most current locations of each of the users.

2. The method according to claim 1, wherein after the gradual expanding of the starting region in accordance with the most current location of each of the users who participate in sharing their locations, until the target region including the most current locations of all the users who participate in sharing their locations is acquired, further comprising:
    expanding the target region according to a preset multiple; and
    wherein the determining and the displaying of the viewable region on the map in accordance with the target region, comprises:
    determining and displaying the viewable region on the map in accordance with the target region after being expanded.

3. The method according to claim 1, wherein the acquiring of the most current locations of all the users who participate in sharing their locations, comprises:
    acquiring an adjusting instruction of the viewable region on the map, and acquiring the most current locations of all the users who participate in sharing their locations according to the adjusting instruction.

4. The method according to claim 3, wherein the acquiring of the adjusting instruction of the viewable region on the map, comprises:
    acquiring the adjusting instruction of the viewable region on the map according to whether the number of users who participate in sharing their locations and the locations of users who participate in sharing their locations has changed, and whether at least one triggering situation set in the adjusting instruction of the viewable region on the map is received.

5. The method according to claim 1, wherein the determining of the starting location on the map, comprises:
    determining a location which corresponds to a point of interest on the map as the starting location, with the point of interest being predetermined by all the users who participate in sharing their locations.

6. The method according to claim 1, wherein the determining of the starting location on the map comprises:
    determining a location on the map which corresponds to the most current location of the user who is one of the users who participate in sharing their locations as the starting location.

7. The method according to claim 1, wherein the gradual expanding of the starting region in accordance with the most current location of each of the users who participate in sharing their locations, until the target region including the most current locations of all the users who participate in sharing their locations is acquired, comprises:
    gradually expanding the starting region centered on the center of the starting region before expanding in accordance with the most current location of each of the users who participate in sharing their locations, until the target region including the most current locations of all the users who participate in sharing their locations is acquired.

8. The method according to claim 1, wherein the gradual expanding of the starting region in accordance with the most current location of each of the users who participate in sharing their locations, until a target region including the most current locations of all the users who participate in sharing their locations is acquired, comprises:
    gradually expanding the starting region in accordance with the location relationship between the starting region and the most current location of each of the users who participate in sharing their locations, until a target region which includes most current locations of all the users who participate in sharing their locations is acquired.

9. The method according to claim 1, further comprises:
    determining and displaying on the viewable region on the map, a respective time spent traveling from the most current locations of each of the users to the preset target location, according to the respective chosen path distances between the preset target location and the most current locations of each of the users.

10. The method according to claim 1, further comprises:
    sending respective chosen path distance prompts to the terminals used by the users who arrive the preset target location.

11. The method according to claim 1, further comprises:
    determining users who deviate from the respective paths according to the most current locations of each of the users, and sending path deviation prompts to the terminals used by the users who deviate from the respective paths.

12. A device for simultaneously displaying multiple users' locations on a map, which includes at least a processor with circuitry operating in conjunction with at least a memory storing codes to be executed to perform functions as a plurality of modules and units, wherein the plurality of modules and units comprise:
    an acquiring module, configured to acquire the most current locations of all the users who participate in sharing their locations;
    a determining module, configured to determine a starting location on the map;

a creating module, configured to create a starting region centered on the starting location;

an expanding module, configured to gradually expand the starting region in accordance with the most current location of each of the users who participate in sharing their locations, until a target region including the most current locations of all the users who participate in sharing their locations is acquired; and a displaying module, configured to determine and display a viewable region on the map in accordance with the target region, wherein the device is further configured to:

determine and display on the viewable region on the map, respective chosen paths between each of the users according to the most current locations of each of the users;

determine and display on the viewable region on the map, respective chosen path distances between users who are along the determined respective chosen paths, and determine and display on the viewable region on the map, respective chosen paths and chosen path distances between a preset target location and at least one of the users who is most proximal to the preset target location according the most current locations of each of the users.

13. The device according to claim 12, wherein the expanding module is further configured to expand the target region according to a preset multiple; and the displaying module is further configured to determine and display the viewable region on the map in accordance with the target region after being expanded.

14. The device according to claim 12, wherein the acquiring module comprises:

a first acquiring unit, configured to acquire an adjusting instruction of the viewable region on the map; and a second acquiring unit, configured to acquire the most current locations of all the users who participate in sharing their locations according to the adjusting instruction.

15. The device according to claim 14, wherein the first acquiring unit is configured to acquire the adjusting instruction of the viewable region on the map according to whether the number of users who participate in sharing their locations and the locations of users who participate in sharing their locations has changed, and whether at least one triggering situation set in the adjusting instruction of the viewable region on the map is received.

16. The device according to claim 12, wherein the determining module is configured to determine a location which corresponds to a point of interest on the map as the starting location, with the point of interest being predetermined by all the users who participate in sharing their locations.

17. The device according to claim 12, wherein the determining module is configured to determine a location on the map which corresponds to the most current location of the user who is one of the users who participate in sharing their locations as the starting location.

18. The device according to claim 12, wherein the expanding module is configured to gradually expand the starting region centered on the center of the starting region before expanding in accordance with the most current location of each of the users who participate in sharing their locations, until the target region including the most current locations of all the users who participate in sharing their locations is acquired.

19. The device according to claim 12, wherein the expanding module is configured to gradually expand the starting region in accordance with the location relationship between the starting region and the most current location of each of the users who participate in sharing their locations, until a target region which includes most current locations of all the users who participate in sharing their locations is acquired.

20. The device according to claim 12, wherein:

the determining module is further configured to determine a respective time spent traveling from the most current locations of each of the users to the preset target location, according to the respective chosen path distances between the preset target locations and the most current locations of each of the users; and the displaying module is further configured to display the respective time spent traveling from the most current locations of each of the users to the preset target location in the viewable region of the map.

21. The device according to claim 12, wherein the device further comprises:

a first sending module, configured to send respective distance prompts to the terminals used by the users who arrive the preset target location.

22. The device according to claim 12, wherein:

the determining module is further configured to determine users who deviate from the respective paths according to the most current locations of each of the users;

the device further comprises:

a second sending module, configured to send path deviation prompts to the terminals used by the users who deviate from the respective paths.

23. A terminal for simultaneously displaying multiple users' locations on a map, comprising at least a memory storing one or more programs, wherein the one or more programs are executed by at least one processors to perform the operations of:

acquiring the most current locations of all the users who participate in sharing their locations;

determining a starting location on a map, creating a starting region centered on the starting location, and gradually expanding the starting region in accordance with the most current location of each of the users who participate in sharing their locations, until a target region including the most current locations of all the users who participate in sharing their locations is acquired; and determining and displaying a viewable region on the map in accordance with the target region, wherein the device is further configured to:

determine and display on the viewable region on the map, respective chosen paths between each of the users according to the most current locations of each of the users;

determine and display on the viewable region on the map, respective chosen path distances between users who are along the determined respective chosen paths, and determine and display on the viewable region on the map, respective chosen paths and chosen path distances between a preset target location and at least one of the users who is most proximal to the preset target location according the most current locations of each of the users.

* * * * *